United States Patent
Cooley

(10) Patent No.: US 9,154,520 B1
(45) Date of Patent: Oct. 6, 2015

(54) SYSTEMS AND METHODS FOR NOTIFYING USERS OF ENDPOINT DEVICES ABOUT BLOCKED DOWNLOADS

(71) Applicant: Symantec Corporation, Mountain View, CA (US)

(72) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 135 days.

(21) Appl. No.: 13/686,079

(22) Filed: Nov. 27, 2012

(51) Int. Cl.
*H04L 29/06* (2006.01)

(52) U.S. Cl.
CPC ..................................... *H04L 63/20* (2013.01)

(58) Field of Classification Search
CPC ....... G06F 21/56; G06F 21/554; G06F 21/20; H04L 63/10; H04L 63/14
USPC ............................................................ 726/1
See application file for complete search history.

(56) References Cited

U.S. PATENT DOCUMENTS

| | | | | |
|---|---|---|---|---|
| 6,092,194 A * | 7/2000 | Touboul | | 726/24 |
| 6,804,780 B1 * | 10/2004 | Touboul | | 713/181 |
| 2008/0072302 A1 * | 3/2008 | Parkinson | | 726/9 |
| 2009/0010414 A1 * | 1/2009 | Siegrist | | 379/210.02 |
| 2009/0287705 A1 * | 11/2009 | Schneider | | 707/9 |
| 2012/0222107 A1 * | 8/2012 | Sainio et al. | | 726/12 |
| 2013/0312054 A1 * | 11/2013 | Wang et al. | | 726/1 |
| 2014/0250526 A1 * | 9/2014 | Khanna et al. | | 726/22 |

* cited by examiner

*Primary Examiner* — Harunur Rashid
(74) *Attorney, Agent, or Firm* — ALG Intellectual Property, LLC

(57) ABSTRACT

A computer-implemented method for notifying users of endpoint devices about blocked downloads may include (1) detecting, at a networking device, at least one attempt by an endpoint device to download a file from an external network, (2) determining that the networking device has already blocked at least one previous attempt to download the file from the external network based at least in part on at least one potential policy violation associated with the file, (3) directing the networking device to block the attempt by the endpoint device to download the file from the external network, and then (4) providing the endpoint device with at least one notification indicating that the attempt by the endpoint device to download the file has been blocked based at least in part on the potential policy violation associated with the file. Various other methods, systems, and computer-readable media are also disclosed.

20 Claims, 7 Drawing Sheets

```
                                File Request
                                    210
------------------------------------------------------------------------
************************************************

FILE REQUESTED FOR DOWNLOAD:  File 122

FILE REFERENCE 212:  http://www.example.com/download

DEVICE REQUESTING THE FILE FOR DOWNLOAD:  Endpoint Device 202(1)

************************************************
------------------------------------------------------------------------
```

```
                                  Database
                                    120
------------------------------------------------------------------------
************************************************
```

| REFERENCES TO PREVIOUSLY BLOCKED DOWNLOADS | POTENTIAL POLICY VIOLATION(S) |
|---|---|
| http://www.suspicious.com/file-download | Includes Spyware |
| • • • | • • • |
| http://www.example.com/download | Includes Virus |

SYSTEMS AND METHODS FOR NOTIFYING USERS OF ENDPOINT DEVICES ABOUT BLOCKED DOWNLOADS

BACKGROUND

Computer networks often include a network security filter that filters network traffic to identify and block malicious data transfers. For example, a computer network may include a network security filter installed on a gateway device that facilitates data transfers between one or more endpoint devices and the Internet. In this example, while filtering network traffic at the gateway device, the network security filter may receive a request from a user of an endpoint device to download a file from the Internet. Upon receiving the user's request to download the file, the network security filter may perform one or more security analyses (such as an Intrusion Detection System (IDS) analysis, an Intrusion Prevention System (IPS) analysis, an antivirus analysis, and/or a firewall analysis) on the file to determine whether the file poses a potential security risk to the endpoint device.

In the event that the security analyses indicate that the file poses a potential security risk to the endpoint device, the network security filter may direct the gateway device to block the download. Unfortunately, the user of the endpoint device may be unaware that the download was actually blocked instead of simply failing due to one or more technical issues. Since the user of the endpoint device may be unaware that the download was actually blocked, the user may continue his or her attempts to download the file without success.

What is needed, therefore, are systems and methods for notifying users of endpoint devices about blocked downloads such that the users know to discontinue their attempts to download files that include potentially malicious content.

SUMMARY

As will be described in greater detail below, the instant disclosure generally relates to systems and methods for notifying users of endpoint devices about blocked downloads such that the users know to discontinue their attempts to download files that include potentially malicious content. In one example, a computer-implemented method for notifying users of endpoint devices about blocked downloads may include (1) detecting, at a networking device, at least one attempt by an endpoint device to download a file from an external network, (2) determining that the networking device has already blocked at least one previous attempt to download the file from the external network based at least in part on at least one potential policy violation associated with the file, (3) directing, in response to the determination, the networking device to block the attempt by the endpoint device to download the file from the external network, and then (4) providing, in response to the determination, the endpoint device with at least one notification indicating that the attempt by the endpoint device to download the file has been blocked based at least in part on the potential policy violation associated with the file.

In some examples, the method may also include receiving a request from the endpoint device to download the file from the external network. In such examples, the method may further include locating a reference to the file in the request received from the endpoint device. In addition, the method may include searching a database that stores information about previously blocked downloads for the reference to the file located in the request and then identifying the reference to the file while searching the database that stores the information about the previously blocked downloads.

In some examples, the method may also include determining that the networking device has already blocked at least one previous attempt by the endpoint device to download the file from the external network. In such examples, the method may further include providing at least one notification indicating that (1) the attempt by the endpoint device to download the file has been blocked based at least in part on the potential policy violation and (2) the previous attempt by the endpoint device to download the file was blocked based at least in part on the same potential policy violation.

In other examples, the method may also include determining that the networking device has already blocked at least one previous attempt by at least one different endpoint device to download the file from the external network.

In some examples, the method may also include enabling the endpoint device to display the notification to at least one user of the endpoint device. In one example, the method may further include redirecting the endpoint device to at least one webpage indicating that the attempt by the endpoint device to download the file has been blocked based at least in part on the potential policy violation. In another example, the method may further include generating at least one markup notification indicating that the attempt by the endpoint device to download the file has been blocked based at least in part on the potential policy violation and then providing the markup notification for display to at least one user of the endpoint device.

In one embodiment, a system for implementing the above-described method may include (1) a detection module programmed to detect, at a networking device, at least one attempt by an endpoint device to download a file from an external network, (2) a determination module programmed to determine that the networking device has already blocked at least one previous attempt to download the file from the external network based at least in part on at least one potential policy violation associated with the file, (3) a blocking module programmed to direct, in response to the determination, the networking device to block the attempt by the endpoint device to download the file from the external network, and (4) a notification module programmed to provide, in response to the determination, the endpoint device with at least one notification indicating that the attempt by the endpoint device to download the file has been blocked based at least in part on the potential policy violation associated with the file. The system may also include at least one processor configured to execute the detection module, the determination module, the blocking module, and the notification module.

In some examples, the above-described method may be encoded as computer-readable instructions on a non-transitory computer-readable-storage medium. For example, a non-transitory computer-readable-storage medium may include one or more computer-executable instructions that, when executed by at least one processor of a networking device, may cause the networking device to (1) detect at least one attempt by an endpoint device to download a file from an external network, (2) determine that the networking device has already blocked at least one previous attempt to download the file from the external network based at least in part on at least one potential policy violation associated with the file, (3) block, in response to the determination, the attempt by the endpoint device to download the file from the external network, and then (4) provide, in response to the determination, the endpoint device with at least one notification indicating that the attempt by the endpoint device to download the file has been blocked based at least in part on the potential policy violation associated with the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary file request and an exemplary database.

Figure 1:
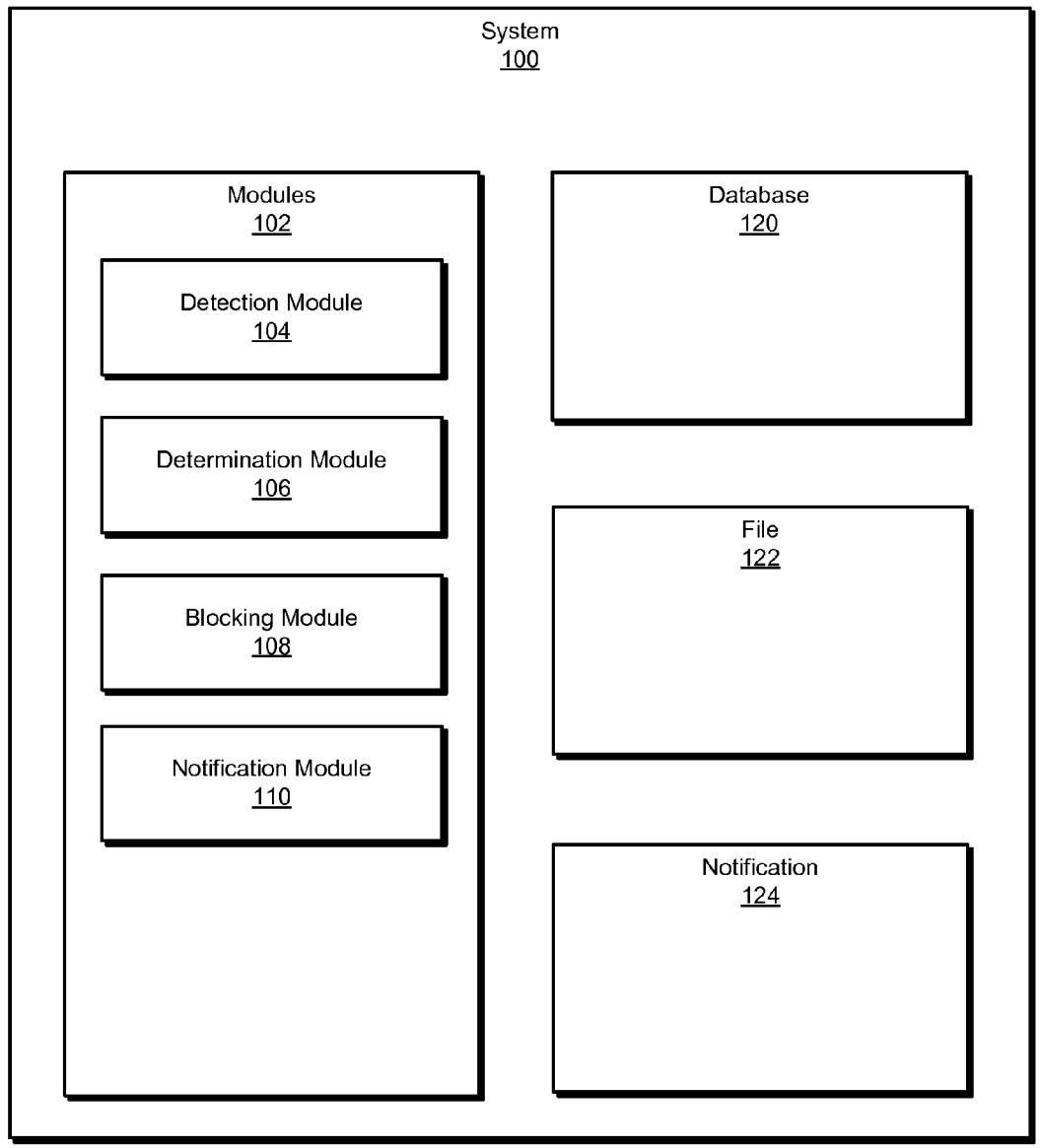
FIG. 1 is a block diagram of an exemplary system for notifying users of endpoint devices about blocked downloads.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for notifying users of endpoint devices about blocked downloads. As will be explained in greater detail below, by notifying users of endpoint devices that their downloads have actually been blocked at a networking device (such as a network gateway), the various systems and methods described herein may enable the users of the endpoint devices to know that their downloads have not simply failed due to temporary technical issues. By enabling the users of the endpoint devices to know that their downloads have not simply failed due to temporary technical issues, the various systems and methods described herein may cause the users of the endpoint devices to discontinue their unsuccessful attempts to complete the blocked downloads. In addition, by notifying the users of the endpoint devices about one or more potential policy violations associated with the blocked downloads, the various systems and methods may provide the users with a general understanding as to why the networking device blocked their downloads.

Figure 2:
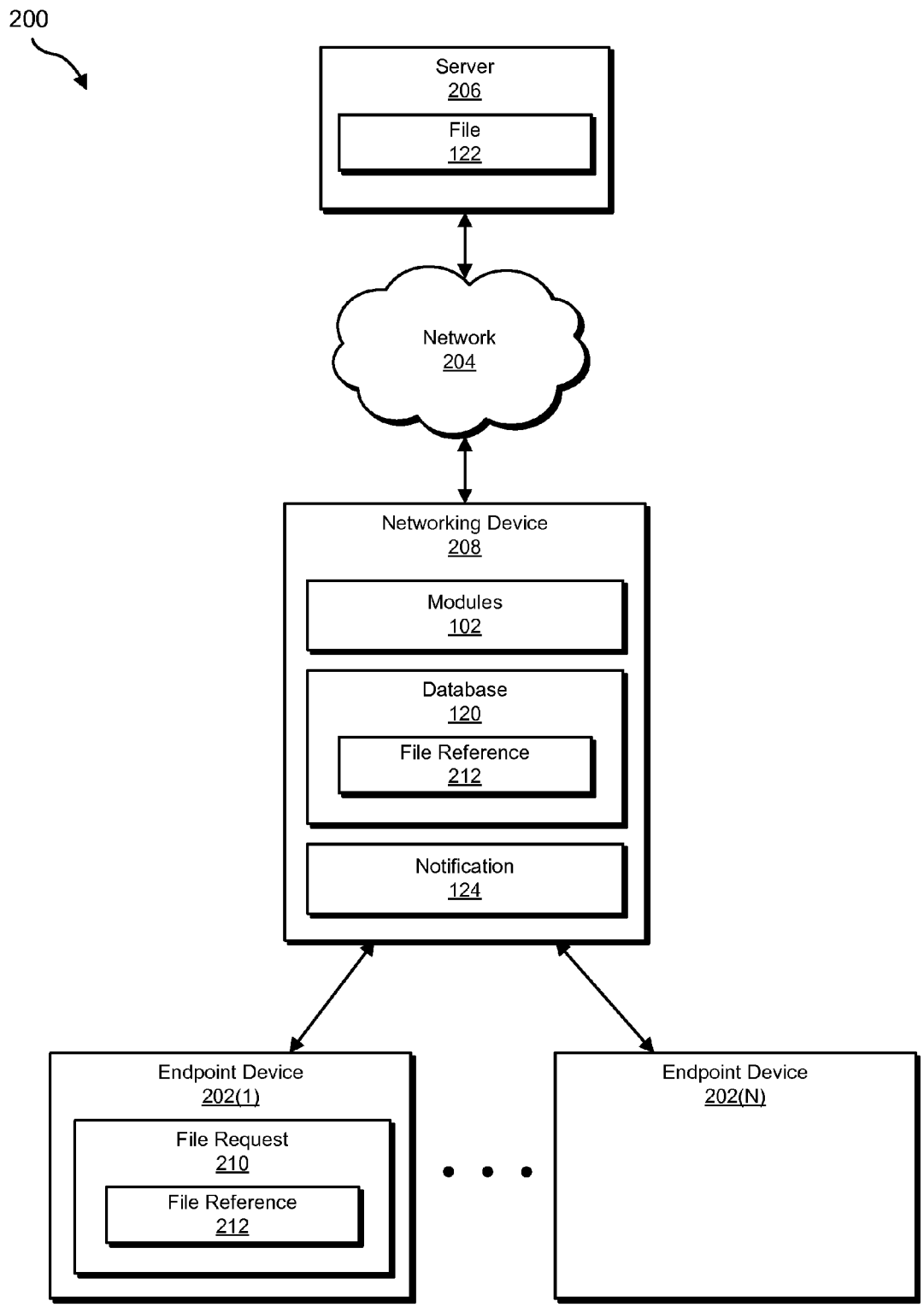
FIG. 2 is a block diagram of an exemplary system for notifying users of endpoint devices about blocked downloads.

The following will provide, with reference to FIGS. 1-2, detailed descriptions of exemplary systems for notifying users of endpoint devices about blocked downloads. Detailed descriptions of corresponding computer-implemented methods will be provided in connection with FIG. 3. Detailed descriptions of an exemplary file request and an exemplary database will be provided in connection with FIG. 4, and detailed descriptions of an exemplary notification will be described in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for notifying users of endpoint devices about blocked downloads. As illustrated in this figure, exemplary system 100 may include one or more modules 102 for performing one or more tasks. For example, and as will be explained in greater detail below, exemplary system 100 may include a detection module 104 programmed to detect, at a networking device, at least one attempt by an endpoint device to download a file from an external network (such as the Internet). Exemplary system 100 may also include a determination module 106 programmed to determine that the networking device has already blocked at least one previous attempt to download the file from the external network based at least in part on at least one potential policy violation associated with the file.

In addition, and as will be described in greater detail below, exemplary system 100 may include a blocking module 108 programmed to direct the networking device to block the attempt by the endpoint device to download the file from the external network. Exemplary system 100 may further include a notification module 110 programmed to provide the endpoint device with at least one notification indicating that the attempt by the endpoint device to download the file has been blocked based at least in part on the potential policy violation associated with the file. Although illustrated as separate elements, one or more of modules 102 in FIG. 1 may represent portions of a single module, application (such as SYMANTEC'S NETWORK SECURITY), or filter (such as a network security filter).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., endpoint devices 202(1)-(N), networking device 208, and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store any type of form of information used to determine whether to block attempts by users of endpoint devices to download one or more files from an external network. For example, database 120 may store one or more references (e.g., one or more Uniform Resource Locators (URLs)) to files involved in previously blocked downloads. In this example, database 120 may also store information that identifies one or more potential policy violations that caused the networking device to block the downloads involving the files.

As illustrated in FIG. 1, exemplary system 100 may further include one or more files, such as file 122. In one example, file 122 may be stored on a network that is external but accessible to the endpoint devices. In this example, file 122 may include potentially malicious content.

In addition, exemplary system 100 may include one or more notifications, such as notification 124. In one example, notification 124 may be generated by the networking device to notify a user of at least one endpoint device about at least one attempt by the endpoint device to download file 122 from the external network. In this example, notification 124 may indicate that at least one attempt by the user of the endpoint device to download file 122 has been blocked based on at least one potential policy violation associated with file 122.

Database 120 may represent portions of a single database or computing device or a plurality of databases or computing devices. For example, database 120 may represent a portion of networking device 208 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as networking device 208 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include endpoint devices 202(1)-(N) in communication with a server 206 via a network 204 System 200 may also include a networking device 208 that facilitates communication and data transfers between endpoint devices 202(1)-(N) and server 206 via network 204.

Networking device 208 may be programmed with one or more of modules 102 and/or may store all or a portion of the data in database 120. For example, as shown in FIG. 2, networking device 208 may store a file reference 212 in database 120. Networking device 208 may also generate and store notification 124 to be provided to endpoint devices 202(1)-(N).

Additionally or alternatively, server 206 may store and host file 122 capable of being downloaded by endpoint devices 202(1)-(N) via network 204. Additionally or alternatively, endpoint device 202(1) may generate and store a file request 210 (such as a Hypertext Transfer Protocol (HTTP) request) that includes file reference 212.

In one embodiment, one or more of modules 102 from FIG. 1 may, when executed by at least one processor of networking device 208, facilitate networking device 208 in notifying users of endpoint devices about blocked downloads. For example, and as will be described in greater detail below, one or more of modules 102 may cause networking device 208 to (1) detect at least one attempt by endpoint device 202(1) to download file 122 from server 206 via network 204, (2) determine that networking device 208 has already blocked at least one previous attempt to download file 122 from server 206 via network 204 based at least in part on at least one potential policy violation associated with file 122, (3) block, in response to the determination, the attempt by endpoint device 202(1) to download file 122 from server 206 via network 204, and then (4) provide, in response to the determination, endpoint device 202(1) with notification 124 indicating that the attempt by the endpoint device to download file 122 has been blocked based at least in part on the potential policy violation associated with file 122.

Endpoint devices 202(1)-(N) generally represent any type or form of computing device capable of reading computer-executable instructions. Endpoint devices 202(1)-(N) may collectively represent a local computer network. Examples of endpoint devices 202(1)-(N) include, without limitation, laptops, tablets, desktops, servers, cellular phones, Personal Digital Assistants (PDAs), multimedia players, embedded systems, combinations of one or more of the same, exemplary computing system 610 in FIG. 6, and/or any other suitable computing device.

Server 206 generally represents any type or form of collection of one or more computing devices capable of storing at least one file and/or providing the file to endpoint devices included in a local computer network. Server 206 may represent a portion of a network external to the local computer network that includes the endpoint devices. Examples of server 206 include, without limitation, application servers, web servers, storage servers, and/or database servers configured to run certain software applications and/or provide various web, storage, and/or database services.

Networking device 208 generally represents any type or form of computing device capable of facilitating, intercepting, and/or blocking downloads between at least one endpoint device and an external network. Examples of networking device 208 include, without limitation, network gateways, default gateways, routers, nodes, laptops, tablets, desktops, servers, cellular phones, Personal Digital Assistants (PDAs), multimedia players, embedded systems, combinations of one or more of the same, exemplary computing system 610 in FIG. 6, and/or any other networking devices.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between endpoint devices 202(1)-(N) and server 206 via networking device 208.

Figure 3:
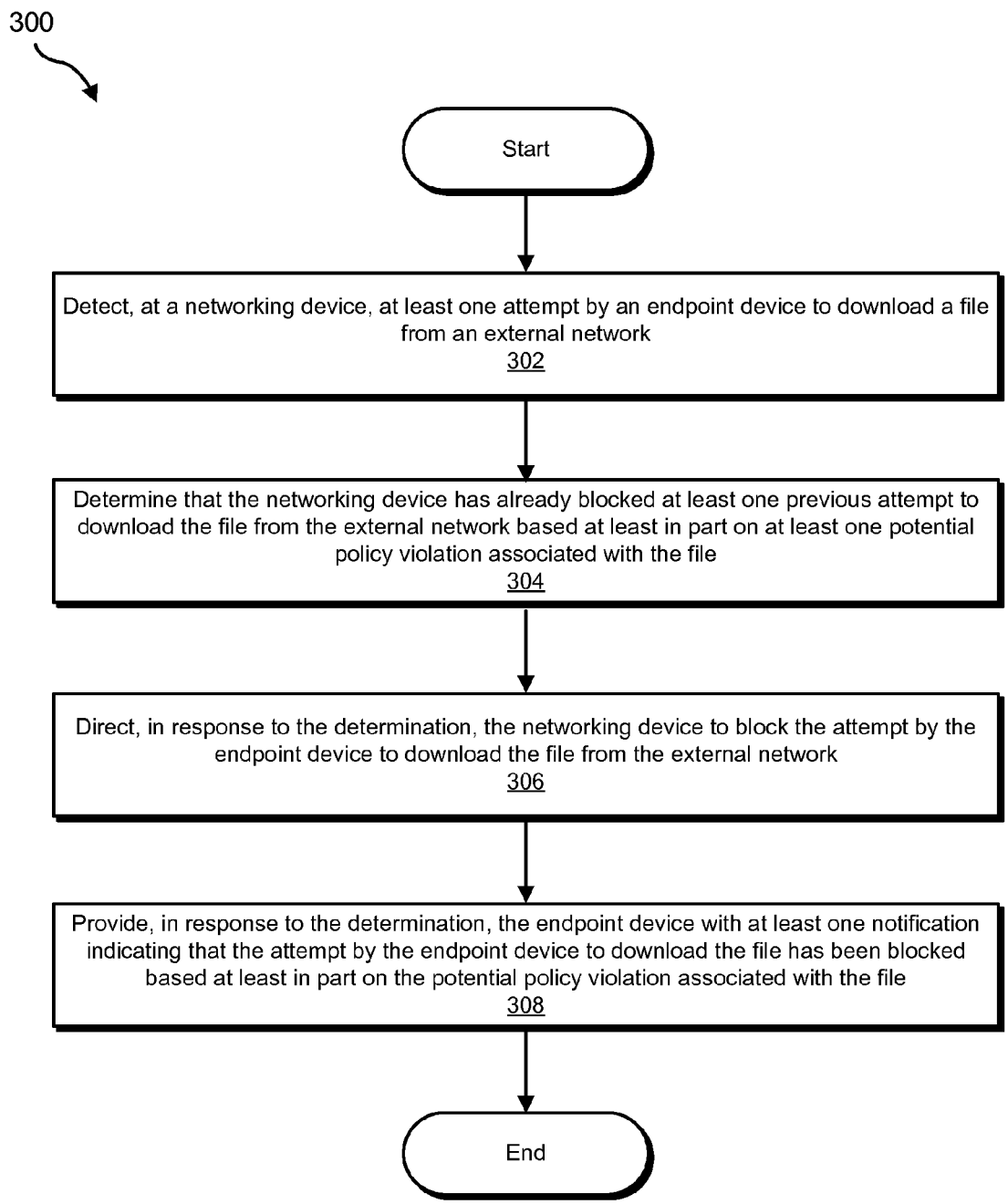
FIG. 3 is a flow diagram of an exemplary method for notifying users of endpoint devices about blocked downloads.

FIG. 3 is a flow diagram of an exemplary computer-implemented method 300 for notifying users of endpoint devices about blocked downloads. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect, at a networking device, at least one attempt by an endpoint device to download a file from an external network. For example, at step 302 detection module 104 may, as part of networking device 208 in FIG. 2, detect at least one attempt by endpoint device 202(1) to download file 122 from an external network. In this example, the external network may include server 206 and/or network 204.

The systems described herein may perform step 302 in a variety of ways. In some examples, detection module 104 may receive file request 210 from endpoint device 202(1) to download file 122 from server 206 via network 204. In one example, a user of endpoint device 202(1) may direct endpoint device 202(1) to submit a request to download file 122 from server 206. In this example, as the request submitted by endpoint device 202(1) reaches networking device 208, detection module 104 may intercept the request to determine whether the requested data transfer includes content that has been potentially prohibited by at least one policy associated with endpoint device 202(1). Examples of such potentially prohibited content include, without limitation, malware, viruses, computer worms, Trojan horses, spyware, adware, social-engineering attacks, rootkits, pornography, copyrighted content, age-restricted content, time-restricted content, identity-restricted content and/or any other types of potentially prohibited content.

As illustrated in FIG. 4, file request 210 may include information that identifies at least one file requested for download by an endpoint device (in this example, "File 122"), the endpoint device requesting to download the file (in this example, "Endpoint Device 202(1)"), and file reference 212 that identifies at least one path to the file requested for download by the endpoint device (in this example, "http://www.example.com/download").

In other examples, detection module 104 may monitor the activity of endpoint device 202(1). In one example, detection module 104 may detect evidence of a data transfer between endpoint device 202(1) and the external network while monitoring the activity of endpoint device 202(1). In this example, detection module 104 may analyze the evidence and then determine that the data transfer includes an attempt by endpoint device 202(1) to download file 122 from server 206 based at least in part on this analysis. The term "evidence," as used herein, generally refers to any type or form of activity, behavior, or information indicating or suggesting that at least one data transfer is occurring (or may potentially occur at a future point in time) between an endpoint computing device and an external network.

As illustrated in FIG. 3, at step 304 one or more of the systems described herein may determine that the networking device has already blocked at least one previous attempt to download the file from the external network based at least in part on at least one potential policy violation associated with the file. For example, at step 304 determination module 106 may, as part of networking device 208 in FIG. 2, determine that networking device 208 has already blocked at least one previous attempt to download file 122 from server 206 via network 204 based at least in part on at least one potential policy violation associated with the file. The phrase "potential policy violation," as used herein, generally refers to any type or form of potential noncompliance with a policy (such as a security policy, a download policy, a content policy, and/or a copyright policy) associated with an endpoint device attempting to download a file. Examples of the potential policy violation include, without limitation, potential security policy violations, potential download policy violations, potential content policy violations, potential copyright policy violations, and/or any other potential policy violations.

The systems described herein may perform step 304 in a variety of ways. In one example, determination module 106 may locate file reference 212 in file request 210 received from endpoint device 202(1). For example, determination module 106 may analyze file request 210 and determine that the "http://www.example.com/download" URL represents file reference 212 to file 122 based at least in part on this analysis. In this example, file reference 212 may identify a path to file 122 stored on server 206 via network 204.

In another example, determination module 106 may locate file reference 212 in the evidence of the data transfer detected between endpoint device 202(1) and server 206. For example, detection module 104 may analyze the evidence of the detected data transfer and then locate file reference 212 in the evidence during this analysis. File reference 212 may identify a path to file 122 stored on server 206 via network 204.

In one example, upon locating file reference 212, determination module 106 may search database 120 for file reference 212 to determine whether file reference 212 identifies a file involved in at least one previously blocked download. For example, as illustrated in FIG. 4, database 120 may include one or more references to files involved in previously blocked downloads (in this example, "http://www.suspicious.com/file-download" through "http://www.example.com/download") and information that identifies one or more potential policy violations that caused networking device 208 to block the downloads involving the files (in this example, "Includes Spyware" through "Includes Virus"). In this example, determination module 106 may identify file reference 212 to file 122 while searching database 120.

In one example, determination module 106 may search database 120 for file reference 212 by comparing file reference 212 with the references included in database 120. For example, determination module 106 may compare file reference 212 with the "http://www.suspicious.com/file-download" URL and the "http://www.example.com/download" URL included in database 120. In this example, determination module 106 may determine that file 122 identified by file reference 212 was involved in at least one previously blocked download based at least in part on this comparison.

In one example, endpoint device 202(1) may have already attempted to download file 122 from server 206 on at least one previous occasion. For example, the user of endpoint device 202(1) may have directed endpoint device 202(1) to submit a previous request to download file 122 from server 206. In this example, networking device 208 may have intercepted the previous request and then determined that file 122 includes potentially prohibited content by performing one or more policy-compliance analyses (such as an IDS analysis, an IPS analysis, an antivirus analysis, a firewall analysis, and/or a content-based analysis) on file 122. In response to this determination, networking device 208 may have blocked the previously requested download and stored a reference to file 122 in database 120.

In another example, endpoint device 202(N) may have already attempted to download file 122 from server 206 on at least one earlier occasion. For example, a user of endpoint device 202(N) may have directed endpoint device 202(N) to submit an earlier request to download file 122 from server 206. In this example, networking device 208 may have intercepted the earlier request and then determined that file 122 includes potentially malicious content by performing one or more policy-compliance analyses on file 122. In response to this determination, networking device 208 may have blocked the earlier requested download and stored a reference to file 122 in database 120.

As illustrated in FIG. 3, at step 306 one or more of the systems described herein may direct the networking device to block the attempt by the endpoint device to download the file from the external network. For example, at step 306 blocking module 108 may, as part of networking device 208 in FIG. 2, direct networking device 208 to block the attempt by endpoint device 202(1) to download file 122 from server 206 via network 204. In this example, blocking module 108 may initiate this blocking process in response to the determination that networking device 208 has already blocked the previous attempt to download file 122 from server 206 via network 204.

The systems described herein may perform step 306 in a variety of ways. In one example, blocking module 108 may cancel file request 210 at networking device 208. For example, blocking module 108 may direct networking device 208 to withhold or delete file request 210 instead of forwarding file request 210 to server 206. In this example, by directing networking device 208 to withhold or delete file request 210 instead of forwarding file request 210 to server 206, blocking module 108 may ensure that endpoint device 202(1) is unable to download file 122 from server 206 via network 204.

In another example, in the event that endpoint device 202(1) has already begun downloading file 122, blocking module 108 may direct networking device 208 to stop facilitating the download. For example, blocking module 108 may direct networking device 208 to at least temporarily shut down communication between endpoint device 202(1) and server 206. In this example, blocking module 108 may also direct endpoint device 202(1) to delete any portion of file 122 that was already downloaded prior to the shutdown of communication between endpoint device 202(1) and server 206.

As illustrated in FIG. 3, at step 308 one or more of the systems described herein may provide the endpoint device with at least one notification indicating that the attempt by the endpoint device to download the file has been blocked based at least in part on the potential policy violation associated with the file. For example, at step 308 notification module 110 may, as part of networking device 208 in FIG. 2, provide endpoint device 202(1) with notification 124 indicating that the attempt by endpoint device 202(1) to download file 122 has been blocked based at least in part on the potential policy violation associated with file 122. In this example, notification module 110 may initiate this process of providing notification 124 to endpoint device 202(1) in response to the determination that networking device 208 has already blocked the previous attempt to download file 122 from server 206 via network 204.

The systems described herein may perform step 308 in a variety of ways. In some examples, notification module 110 may enable endpoint device 202(1) to display notification 124 to the user of endpoint device 202(1). In one example, notification module 110 may redirect endpoint device 202(1) to at least one webpage indicating that the attempt by endpoint device 202(1) to download file 122 has been blocked. For example, notification module 110 may provide endpoint device 202(1) with a reference (such as a URL) to a website configured to display notification 124. In this example, endpoint device 202(1) may receive the reference to the website from notification module 110 and then open the reference to facilitate displaying notification 124 to the user of endpoint device 202(1).

Figure 5:
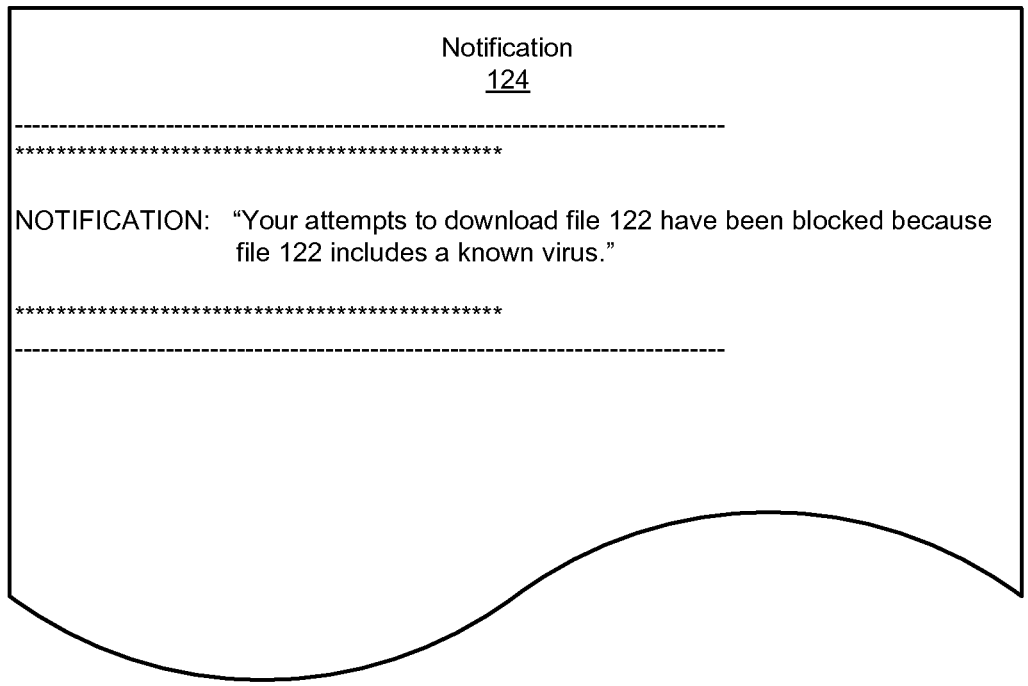
FIG. 5 is an illustration of an exemplary notification.

In one example, in the event that endpoint device 202(1) had already attempted to download file 122 from server 206 on at least one previous occasion, notification 124 may indicate that the attempts by endpoint device 202(1) to download file 122 have been blocked based at least in part on the same potential policy violation associated with file 122. For example, as illustrated in FIG. 5, notification 124 may include information indicating that the attempts by endpoint device 202(1) to download file 122 have been blocked (in this example, "Your attempts to download file 122 have been blocked . . . ") and information that identifies the potential policy violation associated with file 122 that caused networking device 208 to block the attempts by endpoint device 202(1) to download file 122 (in this example, ". . . because file 122 includes a known virus").

In another example, notification module 110 may generate at least one markup notification (such as a Hypertext Markup Language (HTML) notification or an Extensible Markup Language (XML) notification) indicating that the attempt by endpoint device 202(1) to download file 122 has been blocked based at least in part on the potential policy violation associated with file 122. In this example, upon generating the markup notification, notification module 110 may provide the markup notification to endpoint device 202(1). Endpoint device 202(1) may receive the markup notification from notification module 110 and then display the markup notification to the user of endpoint device 202(1).

In some examples, notification module 110 may configure notification 124 based at least in part on a content type associated with file request 210 received from endpoint device 202(1). For example, notification module 110 may identify a content type associated with file request 210 received from endpoint device 202(1). In this example, the content type may represent the format in which endpoint device 202(1) is requesting (or expecting) to download file 122. Examples of the content type include, without limitation, any Multipurpose Internet Mail Extensions (MIME) types, Internet media types, or other suitable content types that represent an octet stream (such as an ".exe" file, an ".apk" file, an ".ipa" file, or a ".cab" file) capable of being executed by an endpoint device or a reference that facilitates access by the endpoint device to a remote storage device (such as a URL that facilitates access to a website hosted by server 206).

Upon identifying the content type associated with file request 210, notification module 110 may generate notification 124 to correspond to the content type and then provide notification 124 to endpoint device 202(1). Endpoint device 202(1) may receive notification 124 from notification module 110 and then display notification 124 to the user of endpoint device 202(1) in accordance with the content type associated with file request 210.

In some examples, notification module 110 may provide notification 124 to endpoint device 202(1) via the communication channel on which endpoint device 202(1) is expecting to receive file 122. For example, notification module 110 may determine that endpoint device 202(1) is expecting to receive file 122 via a particular communication channel. In this example, notification module 110 may then provide notification 124 to endpoint device 202(1) via the particular communication channel in response to this determination.

As explained above in connection with method 300 in FIG. 3, a user of an endpoint device may attempt to download a file from the Internet. For example, the user's endpoint device may submit a request to download the file to a networking device that facilitates data transfers between the endpoint device and the Internet. The networking device may receive the user's request to download the file and then perform one or more security analyses on the file to determine whether the file poses a potential security risk to the endpoint device.

Upon performing the security analyses on the file, the networking device may determine that the file includes malicious content that poses a potential security risk to the endpoint device. The networking device may block the download to prevent the endpoint device from being exposed to the potential security risk and then store a record of the blocked download in a local cache. Unfortunately, the user of the endpoint device may mistakenly assume that the download failed due to a temporary technical issue (such as a communication timeout).

As a result, the user of the networking device may again attempt to download the file. For example, the user's endpoint device may submit another request to download the file to the networking device. The networking device may receive the user's other request to download the file and then check the local cache to determine whether a previous attempt to download the file from the server has already been blocked.

Upon checking the local cache, the networking device may locate the record of the blocked download and then determine that a previous attempt to download the file was already blocked based on the record. In response to this determination, the networking device may provide the endpoint device with a notification indicating that the user's attempts to download the file have been blocked because the file includes malicious content that poses a potential security risk to the endpoint device. The endpoint device may receive the notification from the networking device and then display the notification to the user such that the user knows to discontinue his or her attempts to download the file.

Figure 6:
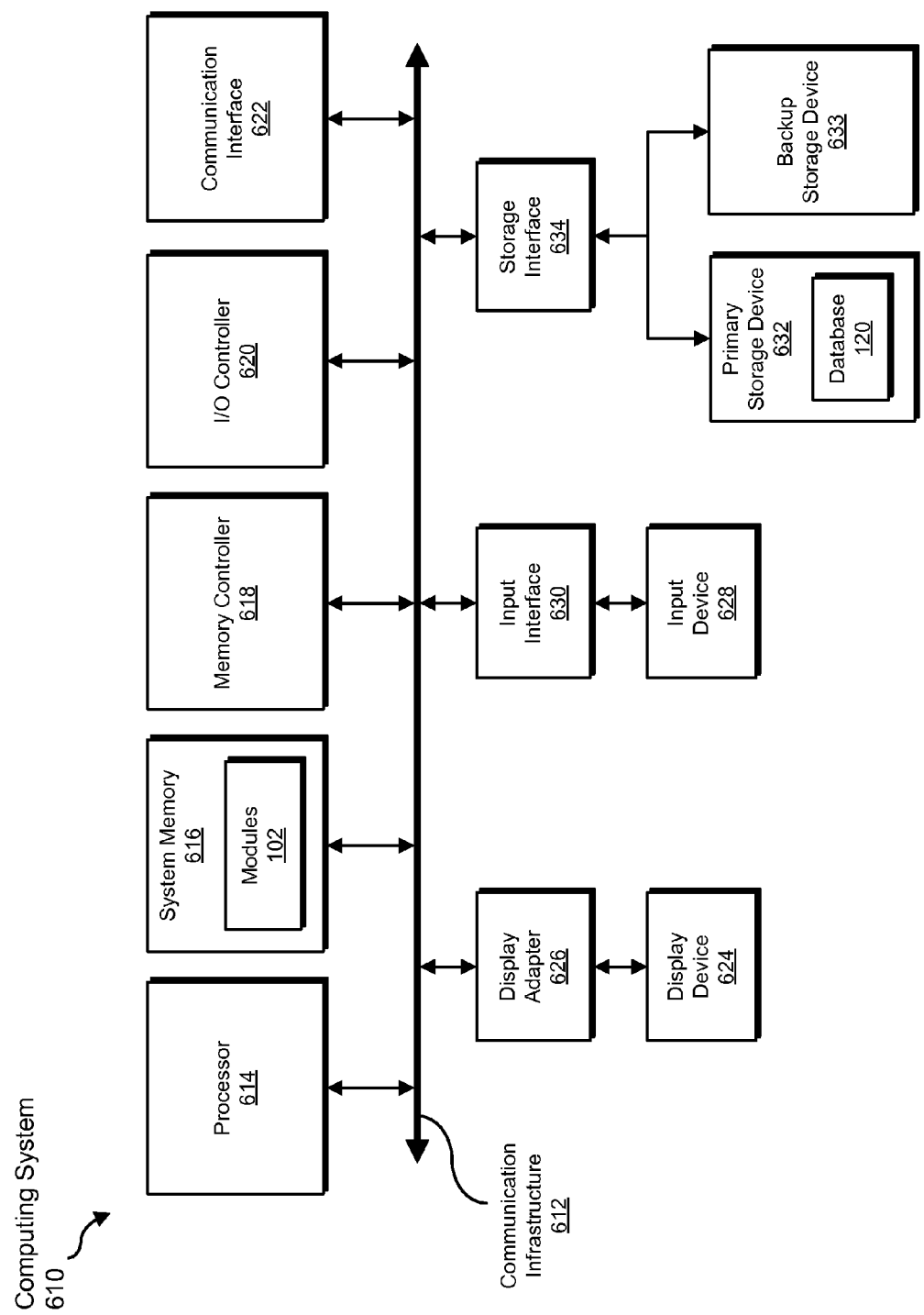
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the detecting, determining, directing, blocking, providing, receiving, locating, searching, identifying, enabling, redirecting, and generating steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630.

Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
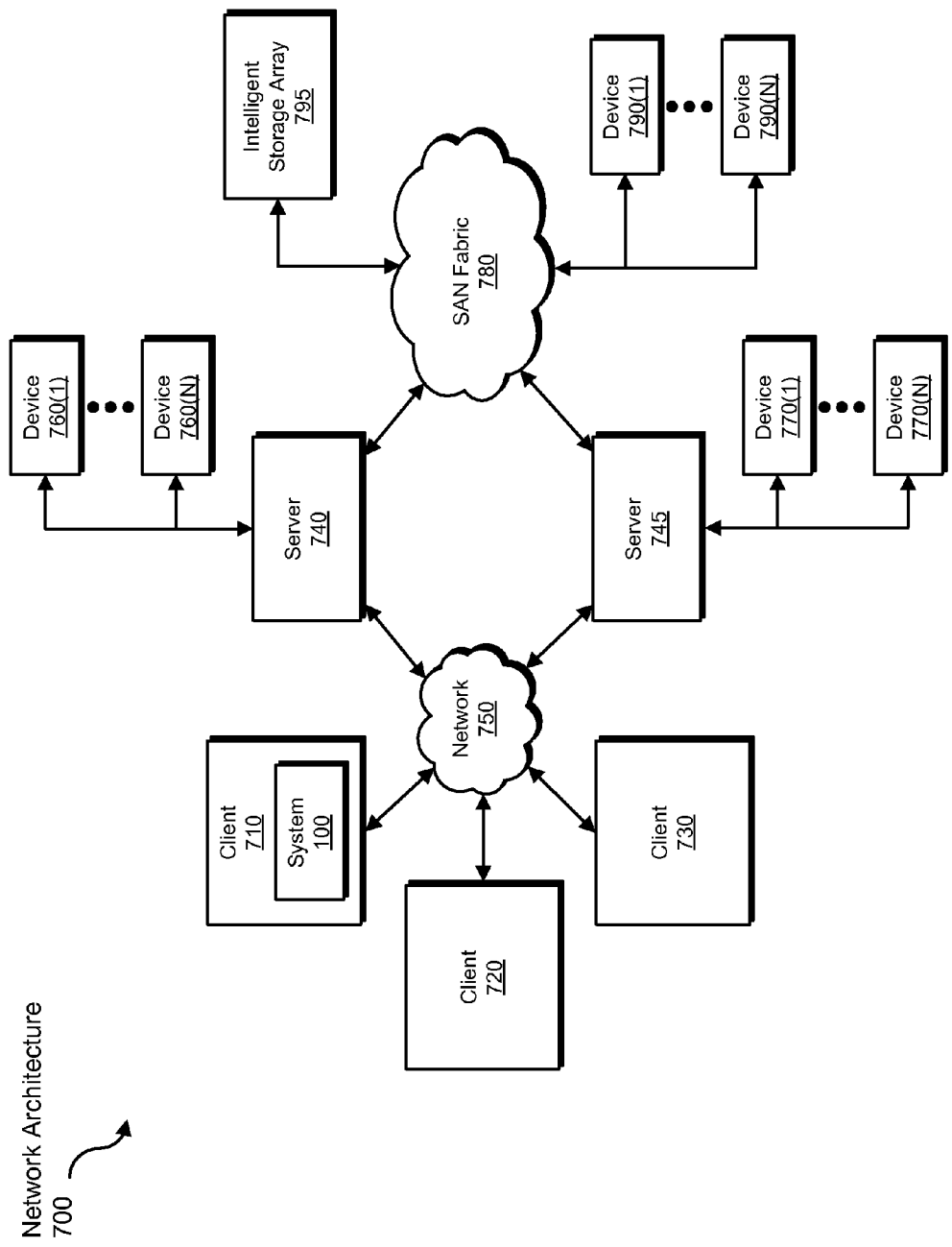
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the detecting, determining, directing, blocking, providing, receiving, locating, searching, identifying, enabling, redirecting, and generating steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for notifying users of endpoint devices about blocked downloads.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request from an endpoint device to download a file, transform the request from the endpoint device to download the file by blocking the request, store the result of the transformation to a database, and then use the result of the transformation to determine that a previous attempt to download the file was blocked. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for notifying users of endpoint devices about blocked downloads, at least a portion of the method being performed by a computing device comprising at least one processor, the method comprising:
   detecting, at a network gateway that facilitates data transfer between an endpoint device and an external network, at least one attempt by the endpoint device to download a file from the external network by receiving a request from the endpoint device to download the file from the external network;
   upon detecting the attempt by the endpoint device to download the file, determining, based at least in part on at least one potential policy violation associated with the file, that the network gateway has already blocked at least one previous attempt by the same endpoint device to download the file from the external network by:
      locating a reference to the file in the request from the endpoint device to download the file from the external network;
      searching a database that stores information about previously blocked downloads for the reference to the file located in the request;
      identifying the reference to the file while searching the database that stores the information about the previously blocked downloads;
      wherein the network gateway detected the potential policy violation associated with the file by performing an Intrusion Detection System (IDS) or Intrusion Prevention System (IPS) analysis on the file;
   in response to determining that the network gateway has already blocked the previous attempt by the same endpoint device to download the file from the external network based at least in part on the potential policy violation associated with the file:
      directing the network gateway to block the attempt by the endpoint device to download the file from the external network;
      providing the endpoint device with at least one notification indicating that the attempt by the endpoint device to download the file has been blocked based at least in part on the potential policy violation associated with the file.

2. The method of claim 1, wherein providing the endpoint device with the notification comprises:
   identifying a content type associated with the attempt by the endpoint device to download the file from the external network;
   generating the notification to correspond to the content type.

3. The method of claim 1, wherein providing the endpoint device with the notification comprises providing at least one notification indicating that:
   the attempt by the endpoint device to download the file has been blocked based at least in part on the potential policy violation associated with the file;
   the previous attempt by the same endpoint device to download the file was blocked based at least in part on the potential policy violation associated with the file.

4. The method of claim 1, wherein providing the endpoint device with the notification comprises enabling the endpoint device to display the notification to at least one user of the endpoint device.

5. The method of claim 1, wherein providing the endpoint device with the notification comprises redirecting the endpoint device to at least one webpage indicating that the attempt by the endpoint device to download the file has been blocked based at least in part on the potential policy violation associated with the file.

6. The method of claim 1, wherein providing the endpoint device with the notification comprises:
   generating at least one markup notification indicating that the attempt by the endpoint device to download the file has been blocked based at least in part on the potential policy violation associated with the file;
   providing the markup notification for display to at least one user of the endpoint device.

7. The method of claim 1, further comprising determining that the network gateway has already blocked at least one previous attempt by at least one different endpoint device to download the file from the external network.

8. The method of claim 1, wherein receiving the request from the endpoint device to download the file from the external network comprises monitoring activity of the endpoint device to detect evidence of data transfer between the endpoint device and the external network.

9. The method of claim 1, wherein directing the network gateway to block the attempt by the endpoint device to download the file from the external network comprises at least one of:
   directing the network gateway to delete the request from the endpoint device to download the file from the external network;
   directing the network gateway to stop facilitating a download of the file by the endpoint device.

10. A system for notifying users of endpoint devices about blocked downloads, the system comprising:
   a detection module, stored in memory, that detects, at a network gateway that facilitates data transfer between an endpoint device and an external network, at least one attempt by the endpoint device to download a file from the external network by receiving a request from the endpoint device to download the file from the external network;
   a determination module, stored in memory, that determines, based at least in part on at least one potential policy violation associated with the file, that the network gateway has already blocked at least one previous attempt by the same endpoint device to download the file from the external network by:
      locating a reference to the file in the request from the endpoint device to download the file from the external network;
      searching a database that stores information about previously blocked downloads for the reference to the file located in the request;
      identifying the reference to the file while searching the database that stores the information about the previously blocked downloads;
      wherein the network gateway detected the potential policy violation associated with the file by performing an IDS or IPS analysis on the file;
   a blocking module, stored in memory, that directs, in response to the determination that the network gateway has already blocked the previous attempt by the same endpoint device to download the file from the external network, the network gateway to block the attempt by the endpoint device to download the file from the external network based at least in part on the potential policy violation associated with the file;

a notification module, stored in memory, that provides, in response to the determination that the network gateway has already blocked the previous attempt by the same endpoint device to download the file from the external network, the endpoint device with at least one notification indicating that the attempt by the endpoint device to download the file has been blocked based at least in part on the potential policy violation associated with the file;

at least one hardware processor that executes the detection module, the determination module, the blocking module, and the notification module.

11. The system of claim 10, wherein the notification module:

identifies a content type of the attempt by the endpoint device to download the file from the external network;

generates the notification to correspond to the content type.

12. The system of claim 10, wherein the notification module provides the endpoint device with at least one notification indicating that:

the attempt by the endpoint device to download the file has been blocked based at least in part on the potential policy violation associated with the file;

the previous attempt by the same endpoint device to download the file was blocked based at least in part on the potential policy violation associated with the file.

13. The system of claim 10, wherein the notification module enables the endpoint device to display the notification to at least one user of the endpoint device.

14. The system of claim 10, wherein the notification module redirects the endpoint device to at least one webpage indicating that the attempt by the endpoint device to download the file has been blocked based at least in part on the potential policy violation associated with the file.

15. The system of claim 10, wherein the notification module:

generates at least one markup notification indicating that the attempt by the endpoint device to download the file has been blocked based at least in part on the potential policy violation associated with the file;

provides the markup notification for display to at least one user of the endpoint device.

16. The system of claim 10, wherein the determination module determines that the network gateway has already blocked at least one previous attempt by at least one different endpoint device to download the file from the external network.

17. The system of claim 10, wherein the detection module monitors activity of the endpoint device to detect evidence of data transfer between the endpoint device and the external network.

18. The system of claim 10, wherein the blocking module directs the network gateway to at least one of:

delete the request from the endpoint device to download the file from the external network;

stop facilitating a download of the file by the endpoint device.

19. A non-transitory computer-readable-storage medium comprising one or more computer-executable instructions that, when executed by at least one processor of a network gateway that facilitates data transfer between an endpoint device and an external network, cause the network gateway to:

detect at least one attempt by the endpoint device to download a file from the external network by receiving a request from the endpoint device to download the file from the external network;

determine, based at least in part on at least one potential policy violation associated with the file, that the network gateway has already blocked at least one previous attempt by the same endpoint device to download the file from the external network by:

locating a reference to the file in the request from the endpoint device to download the file from the external network;

searching a database that stores information about previously blocked downloads for the reference to the file located in the request;

identifying the reference to the file while searching the database that stores the information about the previously blocked downloads;

wherein the network gateway detected the potential policy violation associated with the file by performing an IDS or IPS analysis on the file;

in response to the determination that the network gateway has already blocked the previous attempt by the same endpoint device to download the file from the external network based at least in part on the potential policy violation associated with the file:

block the attempt by the endpoint device to download the file from the external network based at least in part on the potential policy violation associated with the file;

provide the endpoint device with at least one notification indicating that the attempt by the endpoint device to download the file has been blocked based at least in part on the potential policy violation associated with the file.

20. The non-transitory computer-readable-storage medium of claim 19, wherein the one or more computer-executable instructions, when executed by the processor of the network gateway, further cause the network gateway to redirect the endpoint device to at least one webpage indicating that the attempt by the endpoint device to download the file has been blocked based at least in part on the potential policy violation associated with the file.

* * * * *